US006971671B2

(12) United States Patent
Schneider et al.

(10) Patent No.: US 6,971,671 B2
(45) Date of Patent: Dec. 6, 2005

(54) ACTIVE VENTING APPARATUS AND METHOD FOR AIRBAG SYSTEMS

(75) Inventors: David W. Schneider, Waterford, MI (US); Timothy A. DePottey, Flint, MI (US)

(73) Assignee: Autoliv ASP, Inc., Ogden, UT (US)

( * ) Notice: Subject to any disclaimer, the term of this patent is extended or adjusted under 35 U.S.C. 154(b) by 129 days.

(21) Appl. No.: 10/298,492

(22) Filed: Nov. 18, 2002

(65) Prior Publication Data

US 2003/0214125 A1   Nov. 20, 2003

Related U.S. Application Data

(63) Continuation-in-part of application No. 10/150,873, filed on May 17, 2002.

(51) Int. Cl.⁷ ............................................. B60R 21/28
(52) U.S. Cl. ..................................................... 280/739
(58) Field of Search ............................... 280/739, 735, 280/736

(56) References Cited

U.S. PATENT DOCUMENTS

| | | | |
|---|---|---|---|
| 3,386,138 A | 6/1968 | Overman | 24/211 |
| 5,009,374 A | 4/1991 | Manfredi et al. | 244/1 R |
| 5,366,242 A | 11/1994 | Faigle et al. | 280/736 |
| 5,709,405 A | 1/1998 | Saderholm et al. | 280/736 |
| 5,743,558 A | 4/1998 | Seymour | 280/739 |
| 5,853,192 A | 12/1998 | Sikorski et al. | 280/739 |
| 5,899,494 A * | 5/1999 | Lane, Jr. | 280/739 |
| 5,918,901 A | 7/1999 | Johnson et al. | 280/739 |
| 5,997,033 A | 12/1999 | Gray et al. | 280/735 |
| 5,997,230 A | 12/1999 | Dodd et al. | 411/383 |
| 6,017,056 A | 1/2000 | Lee | 280/739 |
| 6,131,949 A * | 10/2000 | Lewis et al. | 280/739 |
| 6,145,878 A * | 11/2000 | Weikl | 280/739 |
| 6,158,770 A | 12/2000 | Ryan et al. | 280/736 |
| 6,161,866 A | 12/2000 | Ryan et al. | 280/736 |
| 6,213,502 B1 | 4/2001 | Ryan et al. | 280/736 |
| 6,241,279 B1 | 6/2001 | Ochiai | 280/735 |
| 6,254,129 B1 | 7/2001 | Rink et al. | |
| 6,305,711 B1 | 10/2001 | Steffens, Jr. et al. | 280/777 |
| 6,361,071 B1 * | 3/2002 | Denz et al. | 280/739 |
| 6,517,108 B1 * | 2/2003 | Vinton et al. | 280/739 |
| 6,705,642 B1 * | 3/2004 | Serban et al. | 280/739 |
| 2004/0056459 A1 * | 3/2004 | Kassman et al. | 280/739 |

FOREIGN PATENT DOCUMENTS

| | | |
|---|---|---|
| EP | 0 945 314 | 9/1999 |
| WO | WO - 01/00456 | 1/2001 |
| WO | WO - 01/15942 A1 | 3/2001 |

* cited by examiner

Primary Examiner—David R. Dunn
(74) Attorney, Agent, or Firm—Sally J. Brown (57) ABSTRACT

Enhanced airbag modules and associated methods are provided. An airbag module according to the invention may have a cushion with a venting portion. During normal vehicle operation, the venting portion may be closed so that inflation gas is not permitted to flow through the venting portion. A pyrotechnic may be ignited to open the venting portion when venting is desired. The pyrotechnic may be directly attached to the venting portion to burn through or mechanically rupture the venting portion, thereby forming an exit port. Alternatively, the venting portion may have a flap that can be detached from the housing by ignition of a pyrotechnic to permit venting through an exit port of the housing. The pyrotechnic may then be disposed within a fastener designed to fracture upon ignition of the pyrotechnic to release the flap from attachment to the housing. The pyrotechnic may, for example, be an initiator or rapid deflagration cord (RDC). The cushion may thus be more stiffly inflated for a high velocity collision, or less stiffly inflated in the case of a lower impact velocity or an out-of-position occupant.

19 Claims, 5 Drawing Sheets

ACTIVE VENTING APPARATUS AND METHOD FOR AIRBAG SYSTEMS

RELATED APPLICATIONS

This application is a continuation-in-part of U.S. application Ser. No. 10/150,873, filed May 17, 2002 and entitled ACTIVE VENTING APPARATUS AND METHOD FOR AIRBAG SYSTEMS, which is incorporated herein by reference.

BACKGROUND OF THE INVENTION

1. Field of the Invention

The present invention relates to systems and methods for protecting vehicle occupants from injury. More specifically, the present invention relates to devices that intelligently control gas venting from an inflatable cushion to enhance the protection provided by the cushion.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees from impact, over a passenger's head, or at other strategic locations.

In the event of an accident, an accelerometer within the vehicle measures the abnormal deceleration and triggers the ignition of a pyrotechnic charge. Expanding gases from the charge fill the airbags, which immediately inflate to protect the driver and/or passengers from impact against the interior surfaces of the vehicle. During normal vehicle operation, airbags are typically stowed behind covers to protect them from tampering and provide a more attractive interior facade for the vehicle.

Some airbag cushions have vents that are designed to permit inflation gas to escape from the cushion at a measured rate, thereby providing a softer cushion. Softer cushions are beneficial in low velocity collisions, in which the cushion need not be extremely stiff to prevent the occupant from contacting the vehicle interior. However, for high speed collisions, a stiffer cushion is needed to more rapidly absorb the occupant's velocity; hence, comparatively less venting is desirable. Other factors, such as the occupant's weight and position influence the optimal stiffness of the cushion.

Since all of the above factors can be expected to vary for any single vehicle, it would be desirable to create a system capable of varying the cushion stiffness in response to changes in vehicle velocity, occupant weight, occupant position, and the like. The desirability of such a system is reflected in the United States government's new frontal safety requirements, as set forth in the FMVSS 208 Ruling.

In response to such a need, some airbag systems have been designed with variable venting systems. Such variable venting systems typically have one or more vents formed in the rigid module housing; the vents are covered or uncovered through the use of some type of actuation mechanism. Thus, the amount of venting that occurs through the rigid module housing can be controlled to influence the stiffness of the cushion.

Unfortunately, known variable venting systems are limited in many respects. For example, many such systems utilize an actuation mechanism that may be too slow to reliably permit the desired degree of venting to occur prior to impact of the occupant against the cushion. Some variable venting systems are simply too slow to vary the cushion stiffness based upon the impact velocity, and are thus unable to adapt the stiffness of the cushion to suit the severity of the collision.

Additionally, placement of vents on the rigid module housing imposes limitations on the size, shape, and location of the vents. Thus, the optimal degree of venting may be unobtainable. More precisely, the vents may not be large enough to release enough gas to soften the cushion as much as may be desirable. The vents may also be obstructed by internal components of the vehicle, thereby further reducing the degree of cushion adaptation that can be achieved.

Furthermore, many known variable venting systems are somewhat complex and expensive to produce. Often, several custom-manufactured parts are required. The design of the airbag module may be unduly hindered by placement of the vents on the rigid module housing. Such placement may interfere with the positioning of other module components such as the inflator, mounting hardware, and the like.

Accordingly, a need exists for an airbag module and associated manufacturing and activation methods by which the stiffness of the cushion can be rapidly adapted. Preferably, such adaptation occurs rapidly enough to take effect after the collision, and yet before the occupant strikes the cushion. Furthermore, such an apparatus and method preferably provides a sufficiently wide variation in cushion stiffness to perform well under high as well as low velocity impact conditions. Yet further, such an apparatus and method is preferably inexpensive and simple to manufacture, with a minimum of modification to existing airbag module designs.

SUMMARY OF THE INVENTION

The apparatus and method of the present invention have been developed in response to the present state of the art, and in particular, in response to the problems and needs in the art that have not yet been fully solved by currently available airbag modules. Thus, it is an overall purpose of the present invention to provide an airbag module that remedies the shortcomings of the prior art. Such an airbag module may rapidly adapt the stiffness of the cushion according to one or more factors such as impact velocity, occupant weight, and occupant position.

To achieve the foregoing, and in accordance with the invention as embodied and broadly described herein in the preferred embodiment, an enhanced airbag module is provided. In one embodiment, the airbag module has a cushion designed to be stowed within a housing for rapid installation in a vehicle. An inflator is disposed at least partially within the housing to provide pressurized gas to the cushion upon receipt of an inflation activation signal.

The cushion has a venting portion positioned in a top panel of the cushion. In other embodiments, the venting portion may be located at other positions on the cushion. The venting portion has a membrane attached to the flexible material of the cushion by a patch. The patch is sewn to the flexible material so that the membrane is captured between the flexible material and the patch. Holes in the flexible material and the patch are aligned on either side of the membrane so that piercing the membrane results in the creation of an exit port through which inflation gas can escape from the cushion.

A pyrotechnic is attached to the membrane; the pyrotechnic comprises a length of rapid deflagration cord, or "RDC." The RDC is disposed in a circular pattern on the membrane. The RDC may extend from the membrane to an igniter near the exterior of the housing. If desired, a high speed fuse may instead couple the RDC to the igniter. The igniter is coupled to an activation device through the use of venting activation wires. The top and bottom panels of the cushion have anchoring ends that are attached to anchoring rods. The anchoring rods are anchored within anchoring indentations of the housing, so that inflation gas from the inflator directly enters the cushion upon deployment of the inflator.

When a collision is detected, an inflation activation signal is transmitted to the inflator to trigger inflation of the cushion. The inflator produces pressurized gas, which enters and inflates the cushion. A microprocessor or other activation device evaluates one or more factors, such as impact velocity, occupant weight, and occupant position, and determines whether active venting should be performed.

For example, if the impact occurs at high velocity or the vehicle occupant is comparatively heavy, a stiffer cushion may provide the best protection, and the venting portion may not be opened. However, if the impact is a low velocity collision and/or the occupant is lighter, the RDC is ignited to permit venting through the venting portion, thereby reducing the stiffness of the cushion.

More precisely, a venting activation signal is transmitted to the igniter, which ignites the RDC. Ignition of the igniter induces the RDC to ignite, thereby burning through the membrane along the length of the RDC. As a result, a generally circular exit port may be formed in the membrane at the former location of the RDC. The membrane may be specially designed to provide rapid and even burn-through upon ignition of the RDC.

The venting activation signal may be transmitted at a time selected to permit full and rapid deployment of the inflatable protection zone prior to venting. A pre-established delay may be used to time the venting activation signal with respect to the inflation activation signal to ensure that inflation occurs before venting. In certain circumstances, such as when an occupant is "out-of-position," or outside their normal seated position in alignment with the airbag, the delay may be omitted to further reduce the stiffness of the cushion.

According to one alternative embodiment of the invention, an airbag module has a cushion and a housing similar to those described above. The cushion also has a venting portion configured differently from that described above. The venting portion may be positioned on a bottom panel of the cushion. No membrane need be used. Rather, a pyrotechnic, in the form of an initiator, is attached directly to the flexible material of which the cushion is generally formed. The venting portion may include a frangible region of the flexible material, which optionally comprises perforations or other structures that provide an exit port having the desired size and shape upon ignition of the initiator. The initiator is coupled to an activation device by venting activation wires.

After inflation occurs, if additional venting is desired, the venting portion is opened by igniting the initiator. The initiator provides a burst of pressurized gas that mechanically ruptures the frangible region of the venting portion of the cushion. As a result, an exit port is formed in the frangible region and inflation gas is able to escape from the cushion via the exit port.

According to another alternative embodiment, an airbag module again has a cushion designed to be stowed within a housing. The cushion has a venting portion that includes a flap disposed generally within the housing. The flap has an anchoring end attached to the housing in such a manner that the flap covers an exit port formed in the housing. The anchoring end is attached to a retaining rod. The retaining rod is, in turn, attached to end plates of the housing through the use of a first pyrotechnic and a second pyrotechnic.

The first and second pyrotechnics are disposed respectively within first and second pyrotechnically releasable bolts. Each of the pyrotechnically releasable bolts has a head and a shank; the shank contains the pyrotechnic at a location selected to fracture the shank just within the end plates. Venting activation wires extend from each of the pyrotechnically releasable bolts to reach an activation device. The top and bottom panels are anchored within the housing independently of the attachment of the flap to the housing so that inflation gas from the inflator directly enters the cushion.

When the pyrotechnics within the pyrotechnically releasable bolts receive the venting activation signal, the bolts are fractured and the retaining rod is freed to move within the housing. The pressure of the inflation gas within the cushion moves the flap to expose the exit port of the housing. Inflation gas is then able to exit the cushion relatively freely via the exit port. If desired, the pyrotechnics within the pyrotechnically releasable bolts may be separately deployable to permit only a single side of the retaining rod to be released from attachment to the housing. The flap may then only partially expose the exit port so that more limited venting is able to occur.

Through the use of the airbag modules and associated methods of the present invention, the stiffness of airbag cushions may be rapidly adapted to suit the circumstances of the collision. Hence, vehicle occupants can receive optimal protection under a wide variety of conditions. Such benefits are obtained with a comparatively small increase in the cost and complexity of the airbag module.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

The present invention utilizes a number of physical principles to enhance the cost-effectiveness and operation of airbag modules. For example, principles of momentum and acceleration are used to determine the stiffness of the cushion required to protect a vehicle occupant in a given situation. The greater the momentum of a body, the greater the force required to stop its motion. Hence, a stiffer barrier is required for high speed collisions and large vehicle occupants. It is desirable to use the softest possible cushion to minimize injuries as a result of contact with the cushion.

Furthermore, gas flow regulation is used to intelligently and rapidly provide the degree of venting required to obtain the optimal stiffness. Gas flow through an opening will generally be proportional to the size of the area encompassed by the opening. An opening in a flexible member may be formed through the sudden application of heat or mechanical force. Alternatively, a flexible member may be used to cover an opening in a manner that is rapidly releasable through the use of a pyrotechnic.

Such principles may be applied to many types of airbags, including driver's side airbags, passenger's side airbags, overhead airbags, knee bolsters and inflatable curtains. The manner in which the present invention utilizes these principles to provide cost-effective, reliable impact protection will be shown and described in greater detail with reference to FIGS. 1 through 5.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
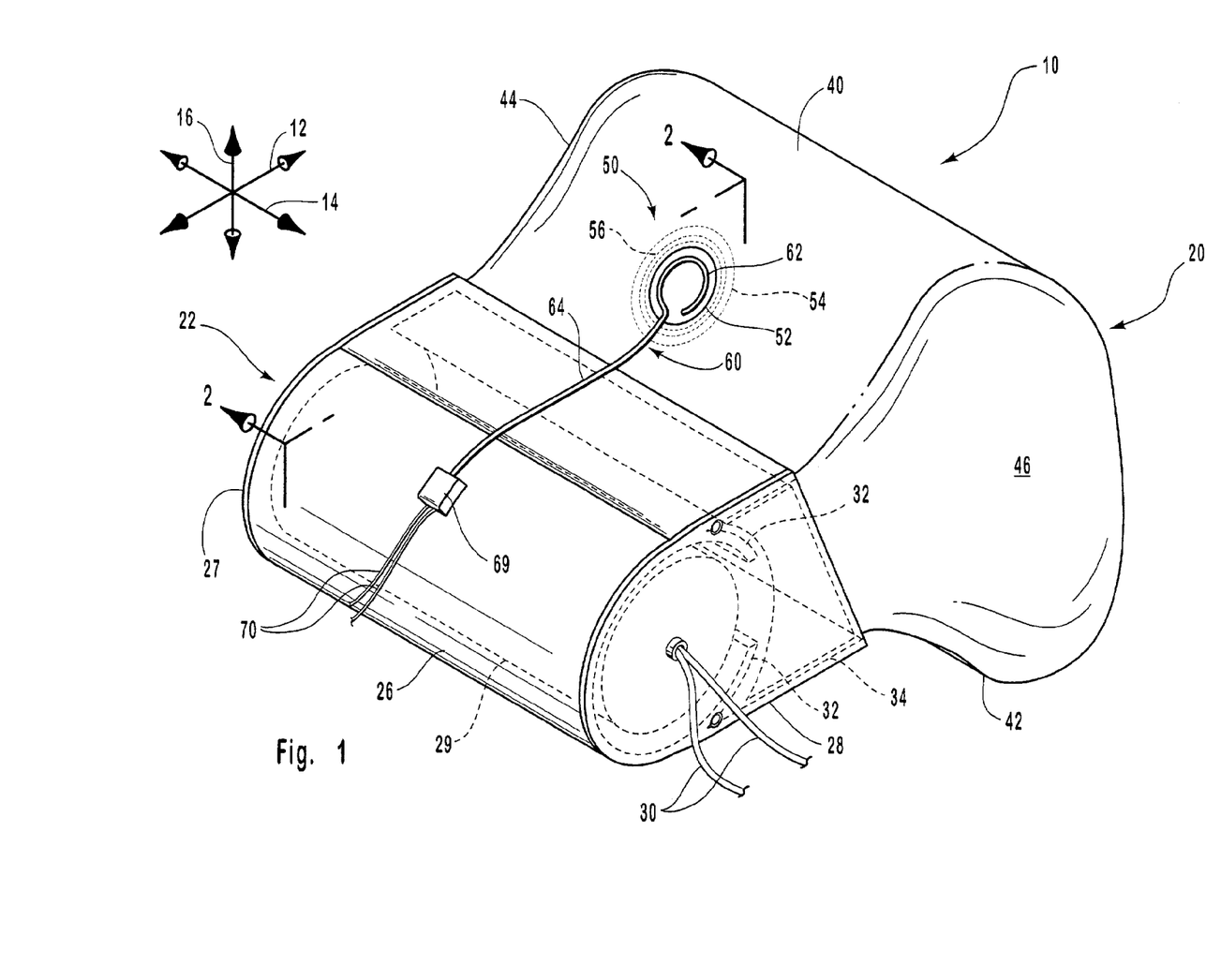
FIG. 1 is a perspective view of one embodiment of an airbag module within the scope of the invention, with the cushion deployed and the venting portion in the closed configuration.

Referring to FIG. 1, a perspective view illustrates an airbag module 10, according to one embodiment of the invention. The airbag module 10 of FIG. 1 is designed for passenger's side, frontal impact protection. However, the principles of the invention are usable with any airbag type, including driver's side front impact airbags, side impact airbags such as inflatable curtains, overhead airbags, and knee bolsters. The airbag module 10 has a longitudinal direction 12, a lateral direction 14, and a transverse direction 16, as shown.

The airbag module 10 has a cushion 20, which may be constructed of a fabric material. If desired, the cushion 20 may be coated to provide heat resistance or other desirable properties. As shown, the cushion 20 is for a driver's or passenger's side front impact airbag. However, the invention includes all types of protective airbags, including side impact airbags, overhead airbags, and knee bolsters, in addition to front impact airbags.

During normal operation of the vehicle (not shown), the cushion 20 is tightly folded and stowed within a housing 22. The housing 22 is rigid, and has a shape suitable for installation in the vehicle. The housing 22 may, for example, be made of a metal. The housing 22 may have installation features (not shown) designed to facilitate installation in the vehicle; such features have been omitted from FIG. 1 for clarity.

The housing 22 has a front side 24 and a rear side 26. The front side 24 faces into the passenger compartment, and is the side from which the cushion 20 will emerge. The front side 24 may be covered by a cover (not shown) that matches the interior trim of the vehicle. The rear side 26 is seated within the vehicle, for example, within the instrument panel. The housing 22 also has a first end plate 27 and a second end plate 28 attached at the lateral ends of the housing 22. According to one example, the remainder of the housing 22 is formed by extrusion, and the end plates 27, 28 are then attached to the extruded shape to form the complete housing 22.

An inflator 29 is disposed within the housing 22. The inflator 29 may be of any known type, such as a pyrotechnic, compressed air, or hybrid inflator. The inflator 29 may also be disposed only partially within the housing 22, if desired. As depicted, the inflator 29 is generally cylindrical in shape. Inflation activation wires 30 convey an inflation activation signal to the inflator 29, which then produces pressurized gas to fill the cushion 20. The housing 22 has a diffuser 32 designed to channel the inflation gas into the cushion 20 at the desired flow rate. As shown, the diffuser 32 may be a pair of arcuate flanges that partially enclose the inflator 29, while leaving a central channel through which inflation gas moves from the inflator 29 to the cushion 20.

The cushion 20 in compacted form is shown in phantom as the compacted cushion 34. For this application, "compacted" refers to any configuration by which the cushion 20 can be made comparatively compact and easy to stow. Thus, the compacted cushion 34 may be folded, rolled, crumpled, or compacted through a combination of techniques.

The cushion 20 may inflate to form a generally tapered rectangular prism, as shown in FIG. 1. Alternatively, the cushion 20 may have a variety of shapes, such as a circle, triangle, ellipse, or more complex polygon. In the rectangular form of FIG. 1, the cushion 20 has a top panel 40, a bottom panel 42, a first side panel 44, and a second side panel 46. A venting portion 50 of the cushion 20 is positioned in the top panel 40. The venting portion 50 is designed to provide "active venting," or actively controllable venting, to decrease the stiffness of the inflated cushion 20 in response to conditions such as low impact speed or an out-of-position vehicle occupant.

More precisely, the venting portion 50 has an open configuration in which inflation gas is able to comparatively freely exit the cushion 20. Additionally, the venting portion 50 has a closed configuration in which the venting portion 50 is substantially sealed so that significant quantities of inflation gas are unable to escape from the cushion 20 prior to impact of the occupant against the cushion 20.

An absolute gastight seal need not necessarily be provided in the closed configuration; rather it may be desirable to permit a measured flow rate of gas to escape from the cushion 20 under all deployment conditions. Thus, the cushion 20 may be slightly gas-permeable in general, or may have one or more vents that are continuously open.

The venting portion 50 of FIG. 1 has a membrane 52 retained by a patch 54. More precisely, the membrane 52 is sandwiched between the patch 54 and the flexible material of which the cushion 20 is generally formed. The flexible material may include a fabric, polymer, elastomer, composite, or the like. According to one embodiment, the cushion 20 is formed of a fabric coated on the interior with a polymer designed to enhance the gas retention capabilities and/or flame resistance of the cushion 20. The patch 54 may also be formed of a fabric, or of any other material with the proper gas retention, flame resistance, and attachment characteristics.

The patch 54 may be attached to the remainder of the cushion 20 by sewing, chemical or adhesive bonding, radio frequency (RF) or ultrasonic welding, or the like. In FIG. 1, a sewing line 56 attaches the patch 54 to the flexible material of which the cushion 20 is generally formed.

A pyrotechnic 60 is attached to the membrane 52 in such a manner that ignition of the pyrotechnic breeches the membrane 52, either by burning through the membrane 52, or through the application of mechanical force. The pyrotechnic 60 may have a wide variety of configurations. In FIG. 1, the pyrotechnic 60 comprises a length of rapid deflagration cord (RDC) 60. The RDC 60 is simply a length of cord designed to burn rapidly and with a high heat output. The RDC 60 has a circular portion 62 disposed directly on the membrane 52 and a linear portion 64 that extends between the circular portion 62 and an igniter 69 disposed on or near the housing 22.

The RDC 60 may be attached to the membrane 52 in a variety of ways. For example, the RDC 60 may be disposed underneath another patch, held in place by stitching, attached by adhesive or chemical bonding, or even threaded directly into the material of the membrane 52.

The circular portion 62 may be used to provide a generally circular exit port in the membrane 52 upon ignition of the RDC 60. If desired, the linear portion 64 may simply be a rapidly burning fuse that is ignited by the igniter 69 and, in turn, ignites the hotter burning material of the circular portion 62 to form the exit port.

The igniter 69 may be positioned at a variety of alternative locations depending on the size of the space in which the housing 22 is to be installed. In certain embodiments, the igniter 69 may be attached directly to the cushion 20, and may be disposed inside or outside the cushion 20. The igniter 69 may simply provide a spark, or may contain an additional pyrotechnic charge. If desired, the igniter 69 may take the form of an initiator like those used to induce deployment of pyrotechnic inflators. Venting activation wires 70 convey a venting activation signal to the igniter 69.

The inflation activation wires 30 from the inflator 29 and the venting activation wires 70 from the igniter 69 are connected to a microprocessor, microcontroller, mechanical switching system, or some other device (not shown) that is capable of determining if and when the inflator 29 and the venting portion 50 should be activated. This device will be referred to as an "activation device."

The activation device may sense a collision through the use of any known sensor, such as a piezoelectric accelerometer (not shown). The activation device may utilize acceleration data, alone or in combination with other data, to determine whether the inflator 29 should be activated. The activation device may also detect other relevant metrics, such as the impact velocity, occupant weight, occupant position, and the like through the use of additional sensors (not shown). These metrics may be used to determine the desired stiffness of the cushion 20, and to determine whether the venting portion 50 should be opened to decrease the stiffness of the cushion 20.

Figure 2:
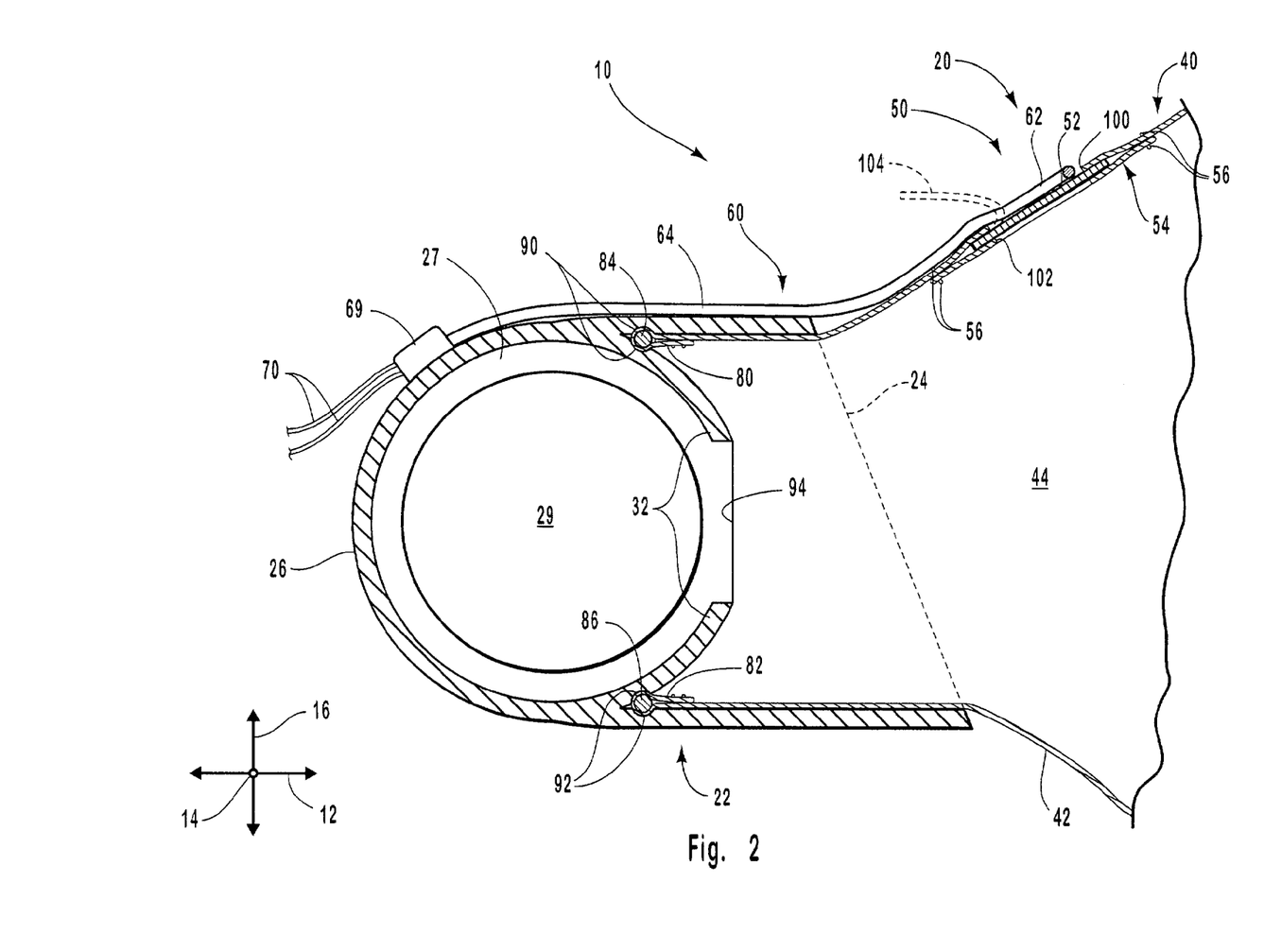
FIG. 2 is a side elevation, section view of the airbag module of FIG. 1, showing the open configuration of the venting portion in phantom.

Referring to FIG. 2, a side elevation, section view depicts a portion of the airbag module 10 in greater detail. As shown, the top and bottom panels 40, 42 of the cushion are anchored within the housing 22. More precisely, each of the top and bottom panels 40, 42 may have an anchoring end 80 and 82, respectively. The top and bottom anchoring ends 80, 82 may be attached to top and bottom anchoring rods 84, 86, respectively. As shown, the anchoring ends 80, 82 may each comprise a length of fabric that is wrapped around the associated anchoring rod 84, 86, respectively, and attached to retain the associated anchoring rod 84, 86.

The housing 22 may be shaped to hold the anchoring ends 80, 82. More specifically, the housing 22 has top anchoring indentations 90 formed in the outer wall of the housing 22 and in the diffuser 32. The anchoring indentations may be generally arcuate in shape, and may form an enclosure that retains the top anchoring end 80. Similarly, the housing 22 has bottom anchoring indentations 92 that are also formed in the outer wall of the housing 22 and in the diffuser 32, to retain the bottom anchoring end 82.

The first side panel 44 has a first inward edge 94 that extends between the top and bottom anchoring ends 80, 82. As shown, the first inward edge 94 abuts and generally wraps around the diffuser 32. However, the first inward edge 94 may have a variety of alternative configurations. The second side panel 46 may also have a second inward edge (not shown) that generally parallels the first inward edge 94.

The cushion 20 may be easily attached to the housing 22. More specifically, prior to attachment of the end plates 27, 28, the anchoring ends 80, 82 of the top and bottom panels 40, 42 are inserted into the top and bottom anchoring indentations 90, 92, respectively, in the lateral direction 14. The first and second inward edges 94 are disposed outside the diffuser 32, as depicted in FIG. 2. The end plates 27, 28 are then attached to the remainder of the housing 22 to capture the anchoring ends 80, 82.

The top and bottom anchoring ends 80, 82 are anchored adjacent to the diffuser 32 so that inflation gas exits the diffuser 32 and immediately enters the cushion 20. Positive pressure forms within the cushion 20 to press the top and bottom panels 40, 42 against the corresponding walls of the inflator 22, and to press the first and second side panels 44, 46 against the first and second end plates 27, 28, respectively. Pressure of the cushion 20 against the interior of the housing 22 tends to form a seal that prevents inflation gas from escaping between the cushion 20 and the housing 22.

Upon detection of a collision, the activation device transmits an inflation activation signal to the inflator 29 via the inflation activation wires 30. The inflator 29 produces inflation gas, which exits the inflator 29 and the diffuser 32 to enter the cushion 20. The inflation gas fills the cushion 20 so that the cushion 20 exits the housing 22 and assumes the shape depicted in FIG. 1.

If the activation device determines that venting through the venting portion 50 is desirable, the activation device also transmits a venting activation signal to the igniter 69 via the venting activation wires 70. The igniter 69 ignites the RDC 60, which rapidly burns through the membrane 52 to provide an exit port that permits inflation gas to exit the cushion 20. Depending on the type and configuration of the RDC 60, the RDC 60 may additionally or alternatively create a pressure wave to punch through the membrane 52 with mechanical force.

The flexible material of which the cushion 20 is generally formed has an opening 100 aligned with the membrane 52. Similarly, the patch 54 has an opening 102 aligned with the membrane 52 and with the opening 100. Hence, when the RDC 60 burns through the membrane 52 the resulting exit port permits inflation gas to flow relatively freely from the cushion 20 to the passenger compartment of the vehicle, through the venting portion 50.

The opened membrane 104 is shown in phantom. If the RDC 60 is disposed in a circle on the membrane 52, as shown in FIG. 1, the resulting exit port may be circular. Alternatively, the exit port may be differently shaped to provide the desired gas flow characteristics. The RDC 60 may even be disposed in a straight, angled, or curved line on the membrane 52 so that the exit port comprises a slit with a corresponding shape. The size of the exit port is selected to permit venting at the desired flow rate. If the exit port is circular, it may have a diameter ranging from about 20 millimeters to about 50 millimeters. Furthermore, the exit port may have a diameter ranging from about 30 millimeters to about 40 millimeters.

It may be beneficial to avoid opening the venting portion 50 until after the cushion 20 has deployed because venting through the venting portion 50 could otherwise slow the deployment of the cushion 20. In order to ensure that the cushion 20 fully inflates in time to cushion the body of the vehicle occupant, the venting activation signal may be delayed by a pre-established time period after the inflation activation signal has been transmitted to the inflator 29.

This pre-established time period may range from about 10 milliseconds to about 100 milliseconds. Furthermore, the pre-established time period may range from about 25 milliseconds to about 75 milliseconds. Yet further, the pre-established time period may range from about 40 milliseconds to about 50 milliseconds. For out-of-position conditions (i.e., the vehicle occupant is out of alignment with the inflatable protection zone 40), it may be beneficial for this time period to be 0 milliseconds, so that activation of the inflator 29 and the venting portion 50 are substantially simultaneous.

In the alternative, the delay may also be varied in response to various factors. For example, a longer delay may make the cushion 20 comparatively stiff when struck by a vehicle occupant, even though venting is used. Similarly, a shorter delay may soften the cushion 20. Thus, the cushion 20 need not be limited to two distinct "stiff" or "soft" configurations.

Furthermore, multiple pyrotechnics may be used. For example, the cushion 20 may have two or more venting portions similar to the venting portion 50 of FIGS. 1 and 2. The venting portions may be independently deployable so that variable venting can be obtained. The venting portions may provide differently sized exit ports. For example, to obtain the greatest cushion stiffness, no venting portions are opened. For a somewhat stiff cushion, only a venting portion with a small exit port is opened. For a somewhat soft cushion, only a venting portion with a large exit port is opened. To obtain the greatest cushion softness, all venting portions may be opened.

Referring again to the embodiment of FIGS. 1 and 2, the membrane 52 may beneficially provide a material that is more readily burned through or mechanically ruptured by the RDC 60. Additionally, the membrane 52 limits the size of the exit port because the surrounding flexible material remains intact. Although the opening 100 in the flexible material of the cushion 20 will tend to concentrate the tensile stresses exerted on the flexible material during deployment, the opening 100 is of a known size, and thus, the stress will be predictable. The patch 54 may serve to reinforce the material surrounding the opening 100. Additional reinforcing members (not shown) may also be attached.

Nevertheless, use of the membrane 52 is optional. The RDC 60 or a different pyrotechnic may be attached directly to the flexible material of a cushion to form an exit port in the flexible material. Furthermore, the venting portion 50 need not be positioned as shown, but may have a variety of different locations on the cushion 20. Many other aspects of the airbag module 10 may be varied to provide alternative embodiments of the invention. One such alternative embodiment will be shown and described in connection with FIG. 3.

Figure 3:
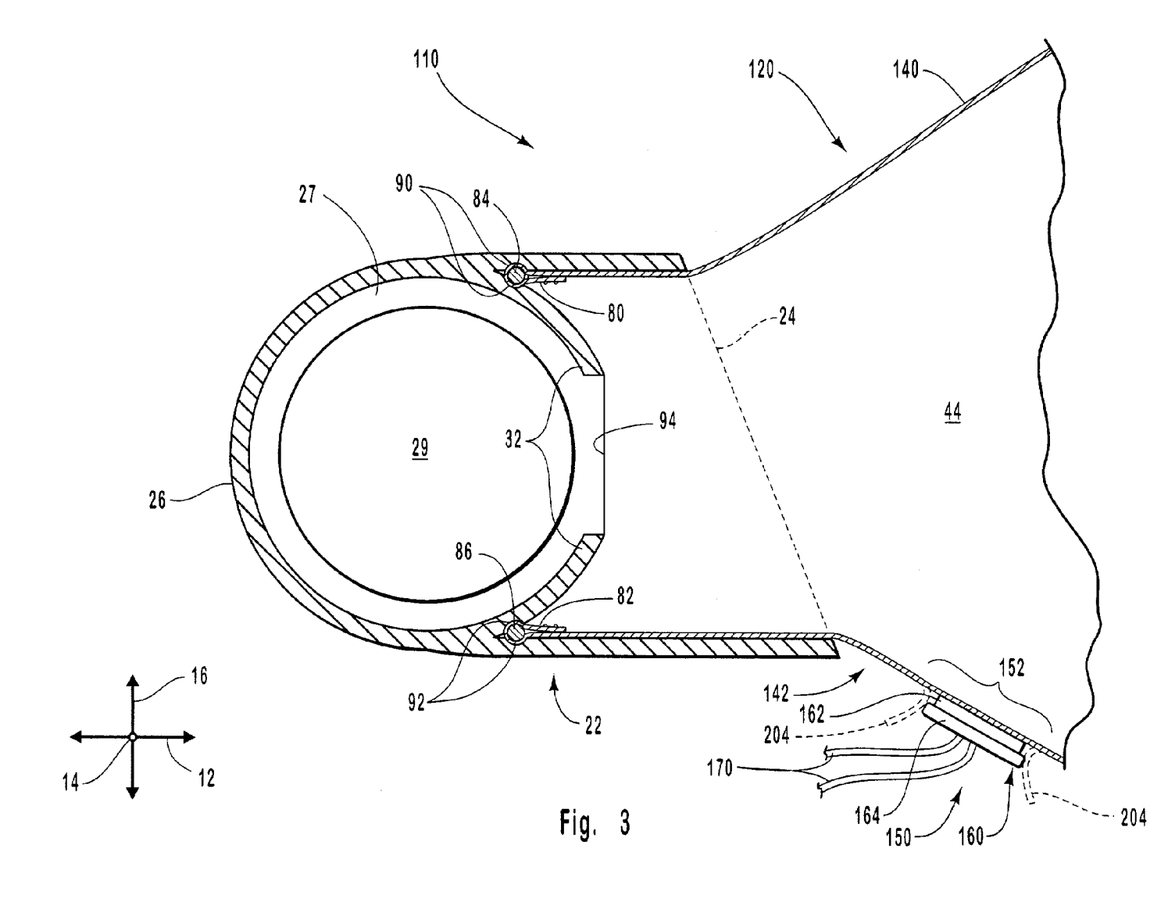
FIG. 3 is a side elevation, section view of one alternative embodiment of an airbag module within the scope of the invention, with the cushion deployed and the venting portion in the closed configuration, with the open configuration shown in phantom.

Referring to FIG. 3, a side elevation, section view shows a portion of another alternative embodiment of an airbag module 110 according to the invention. The airbag module 110 may be configured somewhat similar to the airbag module 10 of FIGS. 1 and 2. More precisely, the airbag module 110 may have a cushion 120 that directly receives the forward momentum of the occupant, and that can be stowed within a housing 22 prior to inflation. The housing 22 may be exactly like that of FIG. 1, and may have a front side 24, rear side 26, first end plate 27, and a second end plate 28. An inflator 29 is disposed within the housing 22, and is activated by inflation activation wires (not shown). A diffuser 32 of the housing 22 partially encloses the inflator 29 to meter the flow of inflation gas upon deployment.

The cushion 120 of the airbag module 110 has a configuration different from the cushion 20 of FIGS. 1 and 2. The cushion 120 has a top panel 140, a bottom panel 142, a first side panel 44, and a second side panel 46. The cushion 120 also has a venting portion 150 disposed, not in the top panel 140, but in the bottom panel 142. Like the venting portion 50, the venting portion 150 may be positioned at a wide variety of alternative positions. Positioning vents on the top or bottom panel 140, 142 has the advantage of directing exhausted inflation gas generally away from vehicle occupants. However, other cushion designs may have other, more desirable venting locations.

Unlike the venting portion 50, the venting portion 150 has no separately attached membrane or patch. Rather, the venting portion 150 simply has a frangible region 152 designed to open upon the application of mechanical force. The frangible region 152 may simply be an unaltered region of the flexible material of which the cushion 120 is made. Alternatively, the frangible region 152 may have one or more weakened sections designed to control the size and shape of the exit port.

For example, the frangible region 152 may be perforated, scored, pre-stressed, etched, or otherwise treated to determine where the breech in the frangible region 152 will form. Such a weakened section may have a circular shape to provide an exit port that also has a circular shape. Other shapes may also be used, as described previously.

A pyrotechnic 160 is attached to the frangible region 152. The pyrotechnic 160 may take the form of an initiator 160 similar to those used to initiate deployment of inflators. The initiator 160 may be of standard design, or may be specially designed to form an exit port of the desired shape in the frangible region 152. As shown, the initiator 160 is comparatively wide and flat. The initiator 160 may be attached to the venting portion 150 in a variety of ways. For example, the initiator 160 may be disposed within a pocket or patch (not shown), attached via fasteners, or bonded to the venting portion 150 through the use of adhesive or chemical agents.

The initiator 160 has a head 162 and a body 164. Venting activation wires 170 convey a venting activation signal to the initiator 160 from the activation device. Upon receipt of the venting activation signal, the charge within the initiator 160 ignites to generate a pressure wave that shatters the head 162 and impinges against the frangible region 152. The pressure wave ruptures the frangible region 152, thereby forming an exit port in the frangible region 152. The initiator 160 may alternatively be configured to form the exit port by producing heat to burn through the frangible region 152.

The opened frangible region 204 is shown in phantom in FIG. 3. The opened frangible region 204 permits inflation gas to flow out of the cushion 120 through the venting portion 150. As a result, the stiffness of the cushion 120 at the time the occupant strikes the cushion may be reduced.

The activation device may determine whether or not to open the venting portion 150 in a manner similar to that described above. Additionally, the activation device may provide a delay between transmission of the inflation activation signal and transmission of the venting activation signal to permit the cushion 120 to deploy fully prior to venting. Again, such a delay may be omitted in the event that the occupant of the vehicle is determined to be out-of-position. Furthermore, multiple venting portions may again be used, and may provide differently sized exit ports.

In the airbag modules 10, 110 of FIGS. 1–3, the venting portions 50, 150 have been located outside the housing 22. As another alternative embodiment, a venting portion may be positioned within the housing 22, and may be opened to permit inflation gas to exit the airbag module from within the housing 22. Such an alternative embodiment will be shown and described with reference to FIGS. 4 and 5.

Figure 4:
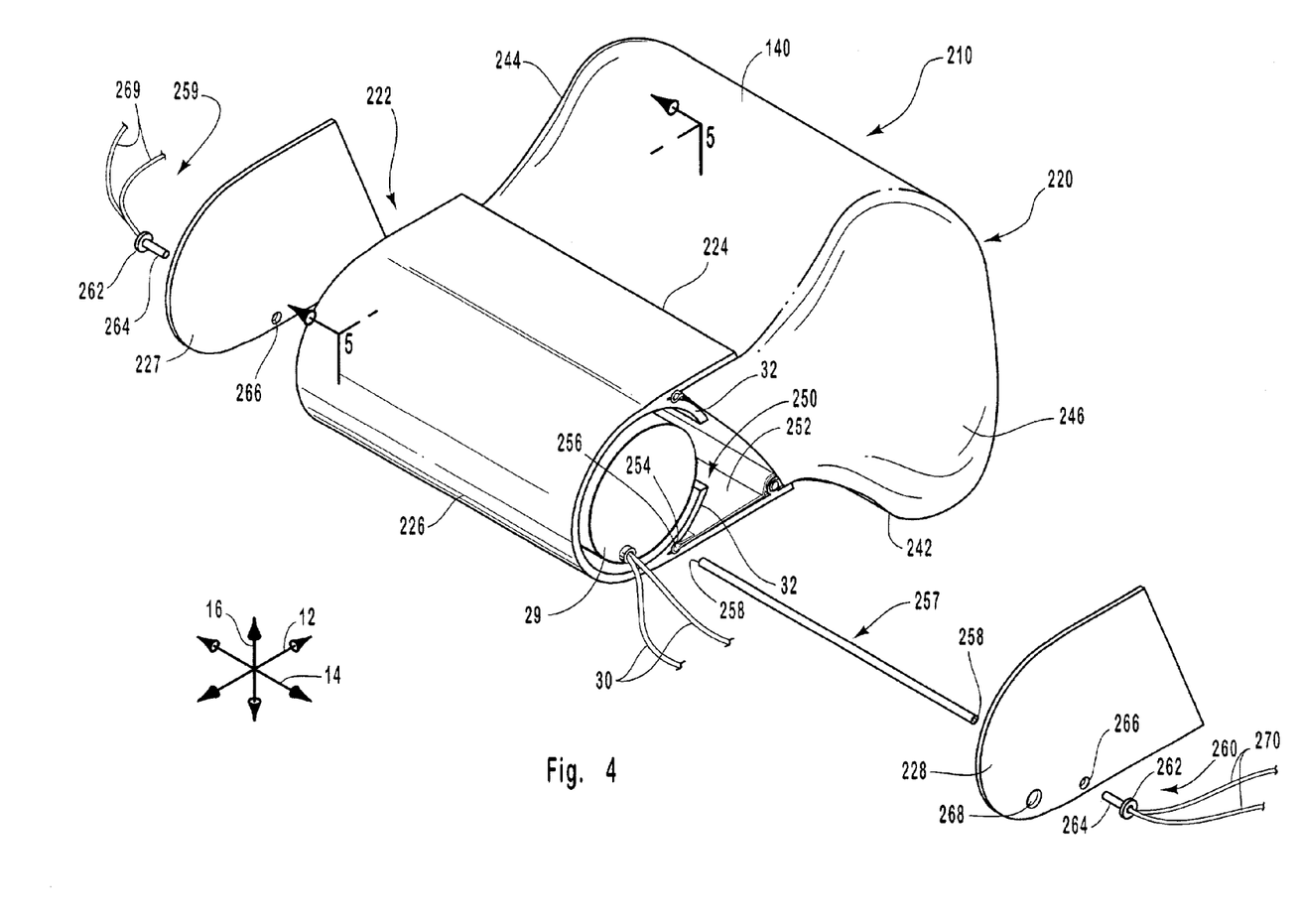
FIG. 4 is an exploded, perspective view another alternative embodiment of an airbag module within the scope of the invention, with the cushion deployed and the venting portion in the closed configuration.

Referring to FIG. 4, an exploded, perspective view shows an airbag module 210 according to another alternative embodiment of the invention. As shown, the airbag module 210 has a cushion 220 somewhat similar to the cushions 10, 110 of the two previous embodiments. The cushion 220 is stowed within a housing 222 prior to inflation. The housing 222 has a front side 224, from which the cushion 220 emerges, and a rear side 226 facing into the vehicle (not shown). The housing 222 also has a first end plate 227 and a second end plate 228 opposite the first end plate 227.

The housing 222 contains an inflator 29 that produces inflation gas upon receipt of an inflation activation signal. A diffuser 32 is formed in the housing 222 to meter the flow rate of inflation gas from the inflator 29 to the cushion 220. Inflation activation wires 30 extend from the inflator 29 to convey an inflation activation signal to the inflator 29.

The cushion 220 has a top panel 140, a bottom panel 242, a first side panel 244, and a second side panel 246. Additionally, the cushion 220 has a venting portion 250 disposed within the housing 222, inward of the bottom panel 242. The venting portion 250 has a flap 252 anchored to the housing 222 by an anchoring end 254. The anchoring end 254 has an enclosure 256; a retaining rod 257 is sized to be inserted into the enclosure 256 in the lateral direction 14.

The retaining rod 257 has apertures 258 at either end; the apertures 258 face the first and second end plates 227, 228 and are designed to facilitate attachment of the retaining rod 257 to the end plates 227, 228. A first pyrotechnic 259 is inserted into one of the apertures 258 to attach the retaining rod 257 to the first end plate 227. Similarly, a second pyrotechnic 260 is inserted into the other aperture 258 to attach the retaining rod 257 to the second end plate 227. The first and second pyrotechnics 259, 260 are designed to attach the retaining rod 257 to the end plates 227, 228 such that the retaining rod 257 can be rapidly detached from the end plates 227, 228 to permit motion of the flap 252.

In FIG. 4, the first and second pyrotechnics 259, 260 take the form of first and second pyrotechnically releasable bolts 259, 260, or first and second bolts 259, 260. Each of the bolts 259, 260 has a head 262 and a shank 264. The shanks 264 are threaded, and corresponding threads are formed within each of the apertures 258 of the retaining rod 257.

Hence, the retaining rod 257 may first be inserted into the enclosure 256 of the anchoring end 254 of the flap 252. The end plates 227, 228 may then be attached to the remainder of the housing 222. The bolts 259, 260 are inserted through anchoring apertures 266 of the end plates 227, 228 and rotated into engagement with the apertures 258 of the retaining rod 257. Thus, the heads 262 of the bolts 259, 260 abut the first and second end plates 227, 228, while the shanks 264 extend through the anchoring apertures 266 of the end plates 227, 228 and into the apertures 258 of the retaining rod 257.

The second end plate 228 has a wiring aperture 268 through which the inflation activation wires 30 are inserted to reach the exterior of the housing 222. First and second venting activation wires 269, 270 extend from the first and second bolts 259, 260, respectively. The venting activation wires 269, 270 may extend from the heads 262 of the bolts 259, 260. The inflation activation wires 30 and the venting activation wires 269, 270 are all coupled to an activation device that transmits inflation activation signals and/or venting activation signals based on sensor data.

Each of the bolts 259, 260 contains a pyrotechnic, such as an initiator, that ignites upon receipt of a venting activation signal to cause the bolt 259 or 260 to fracture. The bolts 259, 260 may be constructed of a metal, plastic, or any other suitable material. Through positioning of the pyrotechnic and design of the casing that encloses the pyrotechnic, the bolts 259, 260 may be made such that the shank 264 of each bolt 259, 260 fractures at a location just inside the end plates 227, 228.

For example, the casing of each of the bolts 259, 260 may have a deliberately introduced stress concentration that determines the position of the resulting fracture line when the pyrotechnic ignites. The result is that the bolts 259, 260 are "unfastened" to permit relative motion between the items that were held together. Thus, the retaining rod 257 can be effectively detached from the end plates 227, 228 upon activation of the bolts 259, 260. The manner in which the venting portion 250 opens to permit venting will be described in greater detail in connection with FIG. 5.

Figure 5:
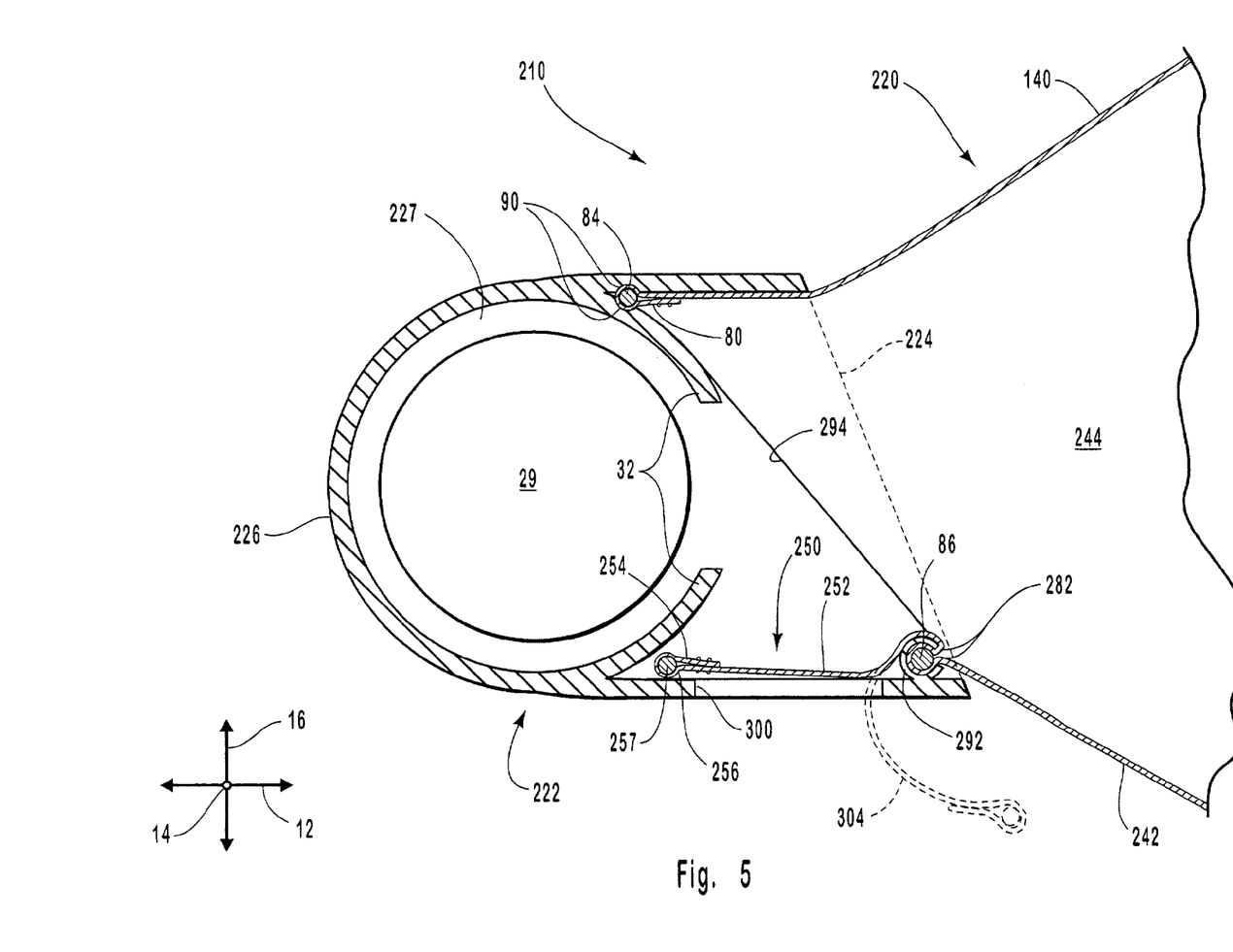
FIG. 5 is a side elevation, section view of the airbag module of FIG. 4, showing the open configuration of the venting portion in phantom.

Referring to FIG. 5, a side elevation, section view of a portion of the airbag module 210 is shown. As depicted, the top panel 140 is anchored within the housing 222 in a manner similar to that of the airbag modules 10, 110 of FIGS. 1 through 3. More precisely, the top panel 140 has an anchoring end 80 wrapped around an anchoring rod 84 and retained by top anchoring indentations 90 formed in the housing 222. The bottom panel 242 also has an anchoring end 282, which is wrapped around an anchoring rod 86 and retained by a bottom anchoring clamp 292 of the housing 222. As shown, the bottom anchoring clamp 292 has a C-shape selected to capture the anchoring end 282 of the bottom panel 242.

Prior to attachment of the end plates 227, 228, the anchoring ends 80, 282 of the top and bottom panels 140, 242 are inserted into engagement with the top anchoring indentations 90 and the bottom anchoring clamp 292, respectively, in a manner similar to that described in connection with FIG. 2. When attached to the housing 222, the end plates 227, 228 capture the anchoring ends 80, 282 so that the cushion 220 is firmly attached to the housing 222.

The flexible material of the bottom panel 242 extends beyond the anchoring end 282 to form the flap 252. The anchoring end 254 of the flap 252 is positioned adjacent to the diffuser 32, and is anchored by the bolts 259, 260, rather than by anchoring indentations formed in the housing 222. In the alternative, the flap 252 may be a separate piece of material attached at or near the bottom anchoring clamp 292.

The first side panel 244 has an inward edge 294, which extends between the anchoring end 80 of the top panel 140 and the anchoring end 282 of the bottom panel 242. The second side panel 246 has a parallel inward edge (not shown). An exit port 300 is formed in the housing 222, and has a generally rectangular shape. When the retaining rod 257 is attached to the housing 222, the flap 252 is positioned to cover the exit port 300, as shown in FIG. 5.

When the activation device detects a collision, an inflation activation signal is transmitted to the inflator 29 via the inflation activation wires 30. The inflator 29 deploys to produce pressurized inflation gas, which fills the cushion 220, causing the cushion 220 to exit the housing 222 and position itself between the vehicle occupant and the adjacent vehicle surface.

If the activation device determines that venting through the exit port 300 is desirable, the activation device also transmits a venting activation signal to the bolts 259, 260 via the venting activation wires 269, 270. The shanks 264 of the bolts 259, 260 fracture, and the retaining rod 257 is detached from the end plates 227, 228. The flap 252 is then free to uncover the exit port 300. In response to the positive pressure within the cushion 220, the flap 252 may extend outward, through the exit port 300. An opened flap 304 is shown in phantom to depict this open configuration. In the alternative, the flap 252 may remain within the cushion 220, but may move forward to lie along the bottom panel 242 of the cushion 220, thereby uncovering the exit port 300. In either case, inflation gas is able to vent from the cushion 220 through the exit port 300.

As with the previous embodiments, the determination of whether or not the venting portion 250 is to be opened may be made based on factors such as the speed of the vehicle, the weight and position of the vehicle occupants, and the like. The delay between transmission of the inflation activation signal and transmission of the venting activation signal may also be actively determined or omitted based upon such factors.

If desired, the bolts 259, 260 may be individually unfastened so that partial venting can be obtained. For example, if the activation device detects that the impact velocity is at a medium level, it may be desirable to only vent through a portion of the exit port 300. Thus, only one of the bolts 259, 260 may be unfastened so that one end of the retaining rod 257 is unfastened while the other remains anchored. The unfastened end may then be drawn forward to uncover a portion of the exit port 300 while the rest remains covered, thereby partially opening the venting portion 250. In the event that high speed impact is detected, both bolts 259, 260 may be unfastened to fully uncover the exit port 300, thereby fully opening the venting portion 250.

If desired, the bolts 259, 260 may be replaced by other pyrotechnic devices designed to unfasten upon receipt of a venting activation signal. In the alternative, any rapid actuating mechanism may be used to release the retaining rod 257, thereby opening the venting portion 250. Solenoids, rotary and linear motors, piezoelectric devices, and the like may all be used in place of pyrotechnics.

The airbag modules and associated methods of the present invention present significant improvements in airbag design. More specifically, the stiffness of the cushion can be rapidly altered to suit the circumstances of the collision so that effective protection can be provided for a wide range of situations. Such enhanced protection is provided with little additional cost and complexity.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module for protecting an occupant of a vehicle from impact, the airbag module comprising:
   an inflator configured to provide pressurized inflation gas upon receipt of an inflation activation signal;
   a cushion configured to receive the inflation gas, the cushion having a venting portion with an open configuration in which inflation gas is able to exit the cushion through the venting portion, and a closed configuration in which the venting portion substantially blocks inflation gas flow through the venting portion;
   a pyrotechnic configured to ignite in response to receipt of a venting activation signal to move the venting portion from the closed configuration to the open configuration;
   wherein the cushion is generally formed of a flexible material, wherein the venting portion comprises a membrane attached to an opening of the flexible material such that ignition of the pyrotechnic forms an exit port in the membrane.

2. The airbag module of claim 1, wherein the cushion is incorporated in an airbag module selected from the group consisting of a driver's side front impact airbag module and a passenger's side front impact airbag module.

3. The airbag module of claim 1, wherein the cushion is incorporated in an airbag module selected from the group consisting of a side impact airbag module, a knee bolster module, and an overhead airbag module.

4. The airbag module of claim 1, wherein the pyrotechnic is positioned proximate the venting portion so that ignition of the pyrotechnic forms an exit port in the venting portion.

5. The airbag module of claim 1, wherein the pyrotechnic is coupled to an activation device configured to trigger ignition of the pyrotechnic after the cushion has substantially inflated to facilitate rapid inflation of the cushion.

6. The airbag module of claim 1, wherein in the open configuration, the venting portion comprises an exit port through which inflation gas is able to exit the cushion, the exit port having an area ranging from about 30 millimeters to about 40 millimeters.

7. An airbag module for protecting an occupant of a vehicle from impact, the airbag module comprising:
- a cushion configured to receive inflation gas, the cushion having a venting portion with an open configuration in which inflation gas is able to exit the cushion through the venting portion, and a closed configuration in which the venting portion substantially blocks inflation gas flow through the venting portion;
- a pyrotechnic positioned proximate the venting portion, wherein the pyrotechnic is configured to ignite in response to receipt of a venting activation signal to form an exit port in the venting portion, thereby moving the venting portion from the closed configuration to the open configuration;
- wherein the pyrotechnic comprises a length of rapid deflagration cord attached to the venting portion to burn through the venting portion as a result of ignition of the rapid deflagration cord.

8. The airbag module of claim 7, further comprising a housing configured to at least partially contain the cushion prior to inflation.

9. The airbag module of claim 8, wherein the venting portion is disposed outside the housing when the cushion is inflated, wherein the venting portion is oriented to release inflation gas in a direction generally away from an occupant of the vehicle.

10. The airbag module of claim 7, wherein the cushion is generally formed of a flexible material, wherein the venting portion comprises a frangible region of the flexible material.

11. The airbag module of claim 10, wherein the frangible region comprises at least one weakened section positioned to control a shape of the exit port.

12. The airbag module of claim 7, wherein the cushion is generally formed of a flexible material, wherein the venting portion comprises a membrane attached to an opening of the flexible material, wherein ignition of the pyrotechnic forms an exit port in the membrane.

13. The airbag module of claim 12, wherein the membrane is retained by a pocket constructed substantially of the flexible material.

14. The airbag module of claim 7, wherein the pyrotechnic is disposed within an initiator attached to the venting portion to mechanically rupture the venting portion as a result of ignition of the pyrotechnic.

15. The airbag module of claim 14, wherein the initiator is attached to the venting portion through the use of an attachment mechanism selected from the group consisting of chemical bonding, adhesive bonding, sewing, RF welding, ultrasonic welding, and thermal welding.

16. The airbag module of claim 7, wherein the length of rapid deflagration cord is coupled to a fuse so that the fuse is able to ignite the rapid deflagration cord.

17. The airbag module of claim 7, wherein the length of rapid deflagration cord is disposed in a generally circular pattern to form the exit port with a generally circular shape.

18. The airbag module of claim 7, wherein the length of rapid deflagration cord is attached to the venting portion through the use of an attachment mechanism selected from the group consisting of chemical bonding, adhesive bonding, sewing, and threading the rapid deflagration cord directly into the venting portion.

19. The airbag module of claim 7, further comprising a second pyrotechnic positioned proximate a second venting portion, wherein the second pyrotechnic is configured to ignite in response to receipt of a second venting activation signal to form a second exit port in a second venting portion, wherein the first and second pyrotechnics are configured to be ignited independently of each other to provide a plurality of venting options.

* * * * *